(12) United States Patent
Lemburg et al.

(10) Patent No.: US 7,740,107 B2
(45) Date of Patent: Jun. 22, 2010

(54) MAINTENANCE PLATFORM

(75) Inventors: Christian Lemburg, Aachen (DE);
Johannes Lemburg, Aachen (DE);
Thomas Schäfer, Aldenhoven (DE);
Carsten Weber, Aachen (DE)

(73) Assignee: Aeroconcept Ingenieurgesellschaft für Luftfahrt-technik und Faserverbundtechnologie mbH (DE)

( * ) Notice: Subject to any disclaimer, the term of this patent is extended or adjusted under 35 U.S.C. 154(b) by 1056 days.

(21) Appl. No.: 10/548,754

(22) PCT Filed: Mar. 9, 2004

(86) PCT No.: PCT/EP2004/002413

§ 371 (c)(1),
(2), (4) Date: Jun. 1, 2006

(87) PCT Pub. No.: WO2004/081373

PCT Pub. Date: Sep. 23, 2004

(65) Prior Publication Data

US 2007/0007074 A1 Jan. 11, 2007

(30) Foreign Application Priority Data

Mar. 11, 2003 (DE) ................................ 103 11 674

(51) Int. Cl.
*E04G 3/30* (2006.01)
(52) U.S. Cl. ..................... 182/142; 182/223; 182/145
(58) Field of Classification Search .................. 182/142, 182/145, 223, 128
See application file for complete search history.

(56) References Cited

U.S. PATENT DOCUMENTS

| 3,907,066 A | | 9/1975 | Newton |
| 4,082,161 A | | 4/1978 | Johnson |
| 4,637,338 A | * | 1/1987 | Wohrle ........................ 118/126 |
| 4,640,384 A | * | 2/1987 | Kucher et al. .................. 182/51 |
| 5,146,096 A | * | 9/1992 | McConachy .................. 290/44 |
| 5,603,488 A | * | 2/1997 | O'Rourke et al. ........... 254/334 |
| 5,679,174 A | * | 10/1997 | Buongiorno ............. 134/22.18 |
| 7,537,087 B2 | * | 5/2009 | May ........................... 182/142 |
| 2004/0026171 A1 | * | 2/2004 | Chang ........................ 182/145 |

FOREIGN PATENT DOCUMENTS

| CA | 2 341 398 A1 | 3/2000 |
| DE | 43 44 210 A1 | 6/1995 |
| DE | 296 03 278 U1 | 6/1996 |
| DE | 197 26 408 C1 | 3/1999 |
| DE | 199 09 698 A1 | 4/2000 |
| DE | 202 10 406 U1 | 12/2003 |

OTHER PUBLICATIONS http://dictionary.reference.com/browse/platform(accessed: Sep. 8, 2009) (definiton provided in action).*

* cited by examiner

*Primary Examiner*—Katherine W Mitchell
*Assistant Examiner*—Daniel Cahn
(74) *Attorney, Agent, or Firm*—Hahn Loeser & Parks, LLP; John J. Cunniff

(57) ABSTRACT

A maintenance platform for suspension on support cables, in particular for maintaining rotor blades of wind turbines, wherein the maintenance platform is formed by at least two sub-platforms defining a working plane, wherein said sub-platforms are swivably connected to each other by a swivel joint with a swivel axis substantially perpendicular to the working plane.

5 Claims, 9 Drawing Sheets

US 7,740,107 B2

MAINTENANCE PLATFORM

TECHNICAL FIELD

The invention relates to a maintenance platform for suspension on cables, in particular for maintaining wind turbine blades.

BACKGROUND OF THE INVENTION

In the Federal Republic of Germany, wind turbines are deemed by law to be building structures, the engineering design, erection and operation of which are supervised by the building permit offices of the separate states and by the locally competent building authorities.

The competent authorities require above all that wind turbines, and especially their rotor blades and mechanical engineering components, be monitored at periodic intervals to maintain their operational safety. Irrespective of such requirements, regular maintenance and repair are essential for maximum availability of wind turbines.

In the first years of wind power use, telescopic platforms or so-called aerial platforms, mounted on trucks, were used for inspecting, maintaining and repairing rotor blades.

Owing to the rapid increase in the hub heights of wind turbines, and based on many years of experience in cleaning building facades, intensifying use of wind energy in Germany led to modified and hoistable types of suspended access equipment (SAE) being developed. Examples of such suspended access equipment are described in some patents, patent applications and utility models. What is common to all these solutions is that inspection, maintenance and repair work is performed on a rotor blade pointing vertically downward. The rotor is successively rotated so that all the blades can be treated.

The increasing size of wind turbines, not only with respect to hub height, but also to the specific dimensions of the blades, combined with the desire for offshore wind power generation gives rise inevitably to requirements for suspended access equipment that cannot be met or fully met with the construction designs that have existed hitherto. To perform inspection, maintenance and repair work on all the blades of a wind turbine as efficiently as possible, it is necessary to select mountings for the suspended access equipment such that the rotor can still be rotated when the access equipment is suspended. The disadvantage of suspending the access equipment from the rotor blades themselves is that, in order to treat the next rotor blade, the suspended access equipment must be dismounted and remounted again after the rotor has been rotated to the next position. If repair work needs to be carried out in sections where the mounting for the suspended access equipment is located, this type of mounting is doubly unfavorable. Since maintenance and repair work on blades mainly involves lamination and painting work, dismounting and remounting suspended access equipment cannot be carried out until after full hardening, for example of the paint finish, in the area of the mounting.

Current suspended access equipment that is not suspended from the rotor blades themselves, but from the machine house instead have the disadvantage that, although the rotor can still be turned while the suspended access equipment is mounted, it is necessary to release the tension in guy lines to the ground. For offshore applications, such solutions are out of the question, of course.

What is common to all solutions hitherto is that the suspended access equipment lacks the flexibility to adapt to changes in the cross-sectional profile of the workpiece (in this case the blades) during operation.

The bigger rotor blades become, the greater the flange diameters and the greater the maximum blade depth become. The blade tips, etc., and above all their blade thickness, remain approximately the same, in contrast—irrespective of whether the blade is 20 meters or 40 meters in length. The consequence is that the rotor blades can be treated very well in the flange area or in the upper third next to the hub, whereas work becomes increasingly difficult to perform the closer one gets to the blade tip. The reason for this is the increasing gap between the rotor blade or workpiece surface and the closest front handrail (as defined in the DIN EN 1808 standard) of the suspended access equipment, which is limited to a major extent by the distance that personnel can reach.

SUMMARY OF THE INVENTION

The aim of the design presented here is to produce a working or maintenance platform suspended on cables, wherein said platform can be used as universally as possible, especially offshore, and is able during operation to provide greatly differing workspaces with ease and without constructional changes.

'Workspace' refers here to the inner cross-section which is enclosed by the working platform and in which the workpieces to be treated are located. The workpieces may be wind turbine rotor blades, in particular, but can also be masts, chimneys, and the like.

The aforesaid aim is achieved according to the invention by a maintenance platform formed by at least two sub-platforms which define a working plane, said sub-platforms being swivably connected to each other by a swivel joint with a swivel axis substantially perpendicular to the working plane.

A maintenance platform of this kind removes the inability of previously existing suspended access equipment to adapt flexibly to different workpieces whose perpendicular cross-sectional projection changes considerably over the path traveled by the platform. As a result, the personnel is able to perform work simultaneously at any time on different parts of the workpiece.

In one preferred variant of the invention, the maintenance platform has four-part platforms connected to each other by four swivel joints, i.e. by a four-bar linkage, to form a closed chain, such that each sub-platform has two swivel joints with which that particular sub-platform is swivably connected to two adjacent sub-platforms. The configuration in the form of a closed chain with a four-bar linkage leads to the maintenance platform fully enclosing the workspace, thus enabling access from all sides to a rotor blade to be maintained. The enclosed configuration also increases the stability of the maintenance platform, of course. By inserting intermediate segments in each single platform before work begins, it is also easy to move up and down rotor blades with highly divergent geometrical data (especially for flange diameter and maximum blade depth). In one advantageous variant of the invention, the sub-platforms are configured so that they can be enlarged by inserting intermediate segments.

It is preferable that least one of the sub-platforms projects into the interior of the square defined by the four swivel joints. In one particularly preferred variant of the invention, sections of all four sub-platforms project into the interior of the square defined by the four swivel joints forming the corners of said square. This makes the workspace smaller than the square defined by the four swivel joints. In this way, even the narrow blade tips can be well reached from these sections of the sub-platforms extending close to the respective rotor blade.

On the other hand, the workspace can also be enlarged by swiveling the four-part platforms such that the workspace suffices to receive a rotor blade near the blade root, where the rotor blade has the largest dimensions. The four sub-platforms of the maintenance platform define not only the interior workspace but also the outer contours. In one preferred variant of the invention, at least two of the four swivel joints are disposed in the area of these outer contours. Said two swivel joints are preferably not adjacent but opposite each other.

In order to adjust the sub-platforms, a drive is preferably provided for each degree of freedom, said drive connecting two of the preferably four sub-platforms in such a way, for example, that said two sub-platforms as well as the other sub-platforms can be swiveled in the working plane relative to each other with the aid of the drive. The drive provided for swiveling the sub-platforms is preferably a spindle drive that connects two of the preferably four sub-platforms with each other and is disposed relative to the swivel joint connecting said sub-platforms in such a way that said two sub-platforms as well as the other sub-platforms can be swiveled in the working plane relative to each other with the aid of the spindle drive. Alternatively, the drive can also be disposed in the swivel joints themselves. Overall, a maintenance platform with at least four sub-platforms and at least four swivel joints connecting said sub-platforms enables a four-bar linkage to be realized that permits variable inner contours to be achieved and thus enabling the maintenance platform to be easily adjusted during operation to different cross-sectional profiles.

The maintenance platform preferably has three cable winches as well, with which the maintenance platform can be displaceably attached to three support cables. The cable winches are provided with motors for driving the cable winches in such a way that the resultant speed of movement of all three cable winches is identical when the cable winches are turning. Preferably, therefore, the cable winches all have an identical drum diameter and are driven by electric motors operating with a uniform speed.

The maintenance platform is preferably part of a maintenance system in which the maintenance platform is preferably suspended via the aforementioned cable winches on three support cables, of which at least one is suspended from a cable suspension member on one side of a rotor plane of a wind turbine facing away from the tower. The expression 'facing away from the tower' refers here to the plane described by the rotor blades and in which the rotor blades rotate, and to the wind turbine tower, at the top end of which the rotor blades are usually rotatably mounted to a nacelle which can be swiveled in a horizontal plane such that the plane of the rotor blades is substantially vertical and parallel to the tower. All the support and safety cables are configured in such a way that none of the cables intersect the rotor plane.

With the solution presented here, it is possible to turn the rotor while the suspended access equipment is mounted. The support and safety cables are not fastened simultaneously to the ground. The construction presented is therefore equally suitable for onshore and offshore use.

The cable suspension member preferably has a three-point mounting of adjustable diameter for mounting the cable suspension member on a rotor hub.

In addition, the cable suspension member preferably has a cable mount to which at least one of the support cables must be attached. In relation to the rest of the cable suspension member, the cable mount is preferably freely rotatable, specifically about a rotational axis that is identical to the rotational axis of the rotor blades. Said rotational axis of the cable mount preferably runs through the center of a triangle of attachment points defined by the three-point mounting. The rotational axis is perpendicular to the plane defined by the three attachment points.

The present construction is also rendered suitable for use by virtue of suspension from at least two points, of which at least one is attached to the hub in front of the rotor plane by means of the cable suspension member. The cable suspension member rotates with the rotor, without the support and safety cable rotating as well. This prevents the cables from twisting.

Another advantageous feature of the maintenance platform are the handrails on the sub-platforms. Said handrails on the separate platforms have pipes inside which a cable is guided with longitudinal displaceability, said cable interconnecting the handrails of a plurality of sub-platforms with each other. Due to its longitudinal displaceability, the cable is able to compensate for any changes in spacing between the handrails of different platforms as a result of the sub-platforms being swiveled. Two cables are preferably provided for this purpose and overlap in the area of one of the swivel joints, preferably of the swivel joint facing away from the tower. In addition to compensating for changes in spacing, the cables also have the advantage that they significantly increase the stability of each separate handrail, and in this way contribute to the safety of the maintenance personnel on the maintenance platform.

BRIEF DESCRIPTION OF THE DRAWINGS

Embodiments of the invention shall now be explained in greater detail with reference to the enclosed drawings. The drawings show.

DETAILED DESCRIPTION OF THE INVENTION

Figure 1:
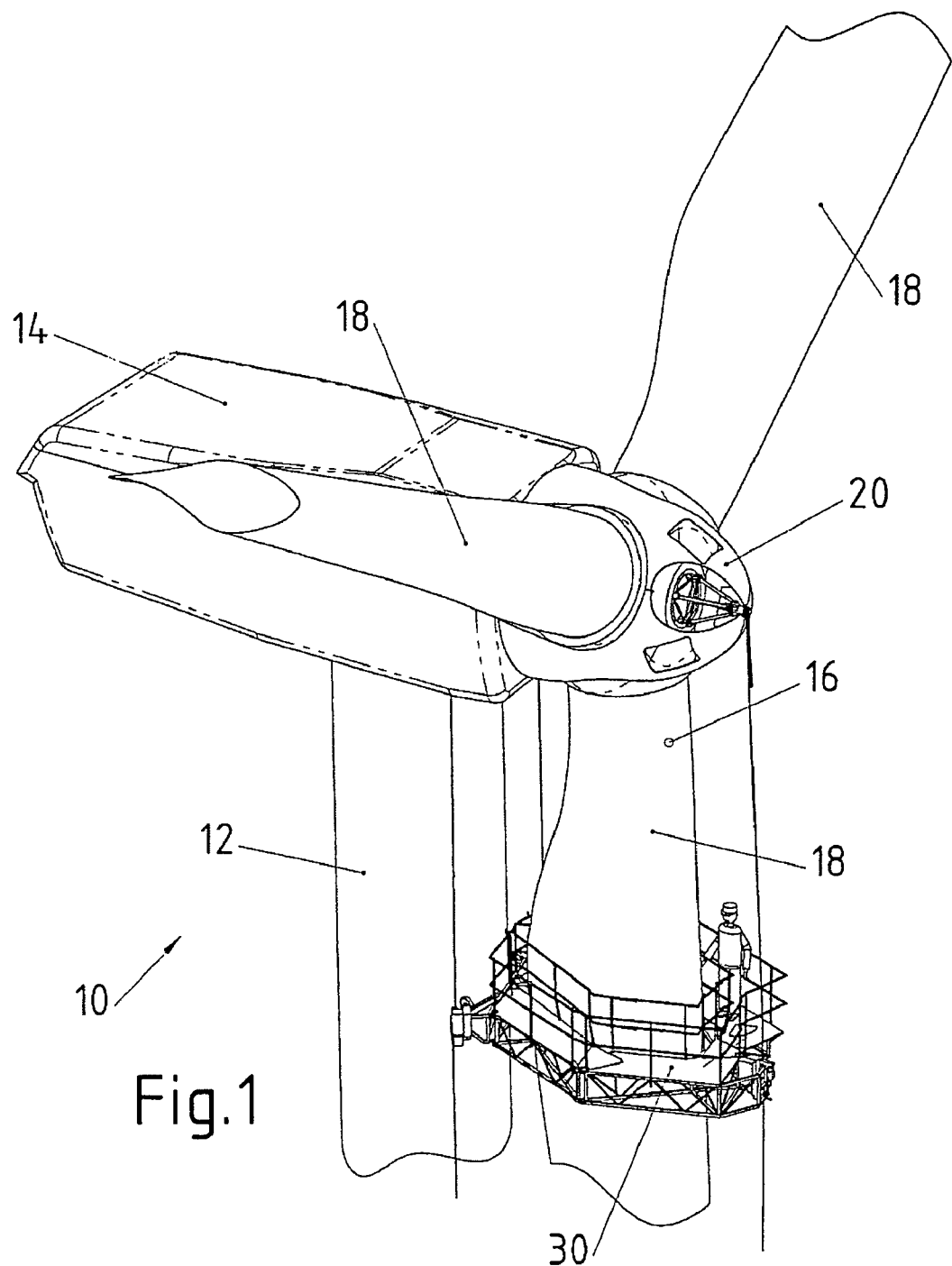
FIG. 1 an upper portion of a wind turbine with a maintenance platform suspended therefrom FIG. 2 a section of FIG. 1, showing details of the maintenance platform FIG. 3 the maintenance platform in FIGS. 1 and 2 (showing the platform only)

The wind turbine 10 shown in FIG. 1 comprises a tower 12, a horizontally swivelable nacelle 14 mounted on the top end of tower 12 and a rotor 16 which is rotatable about a horizontal axis and mounted inside nacelle 14. Rotor 16 comprises three rotor blades 18 attached to a common hub 20.

Figure 2:
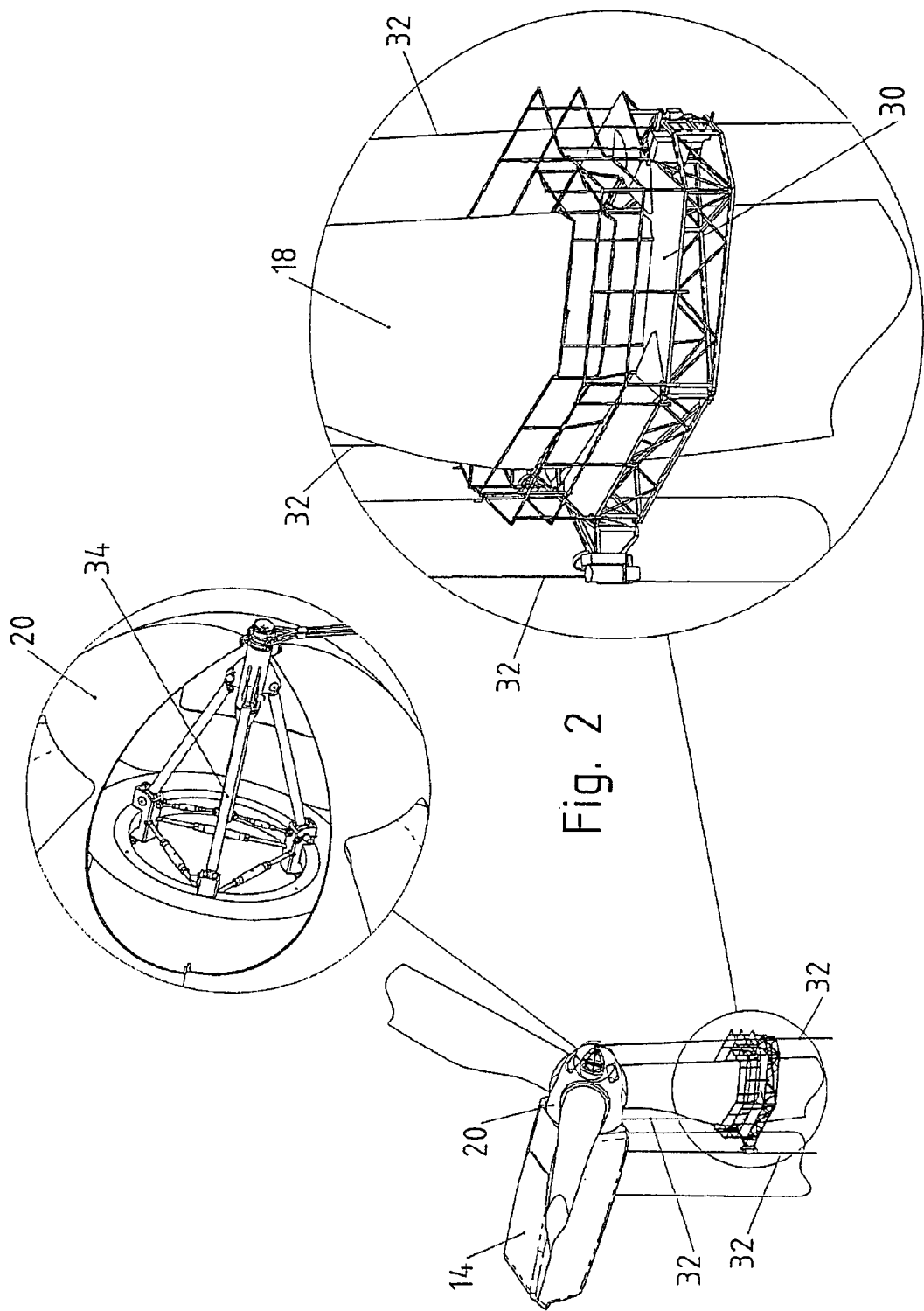

A maintenance platform 30 is suspended from nacelle 14 and hub 20 by means of three support cables 32. One of said support cables 32 is attached to hub 20 by means of a cable suspension member 34, while two additional support cables 32 are attached to nacelle 14. This is shown in greater detail in FIG. 2. The maintenance platform, support cables 32 and cable suspension member 34 together form a maintenance system.

Figure 3:
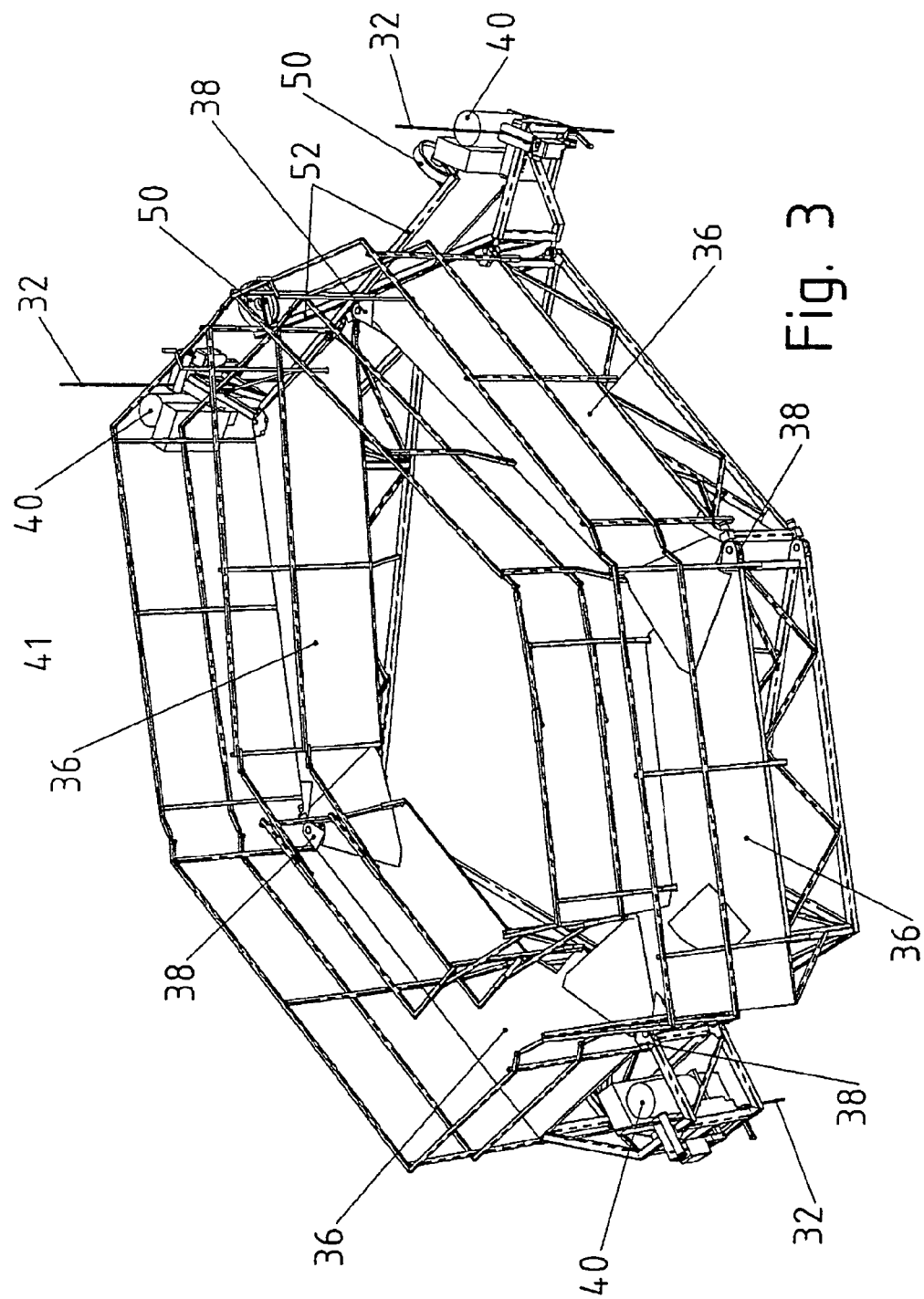

FIG. 3 provides a separate view of maintenance platform 30. Maintenance platform 30 is comprised of four sub-platforms 36 swivably connected to each other by four swivel joints 38 to form a closed chain in the form of a four-bar linkage.

FIG. 3 also shows three cable winches 40 for hoisting maintenance platform 30 along support cables 32 with the aid of an integrated traction motor.

Figure 4:
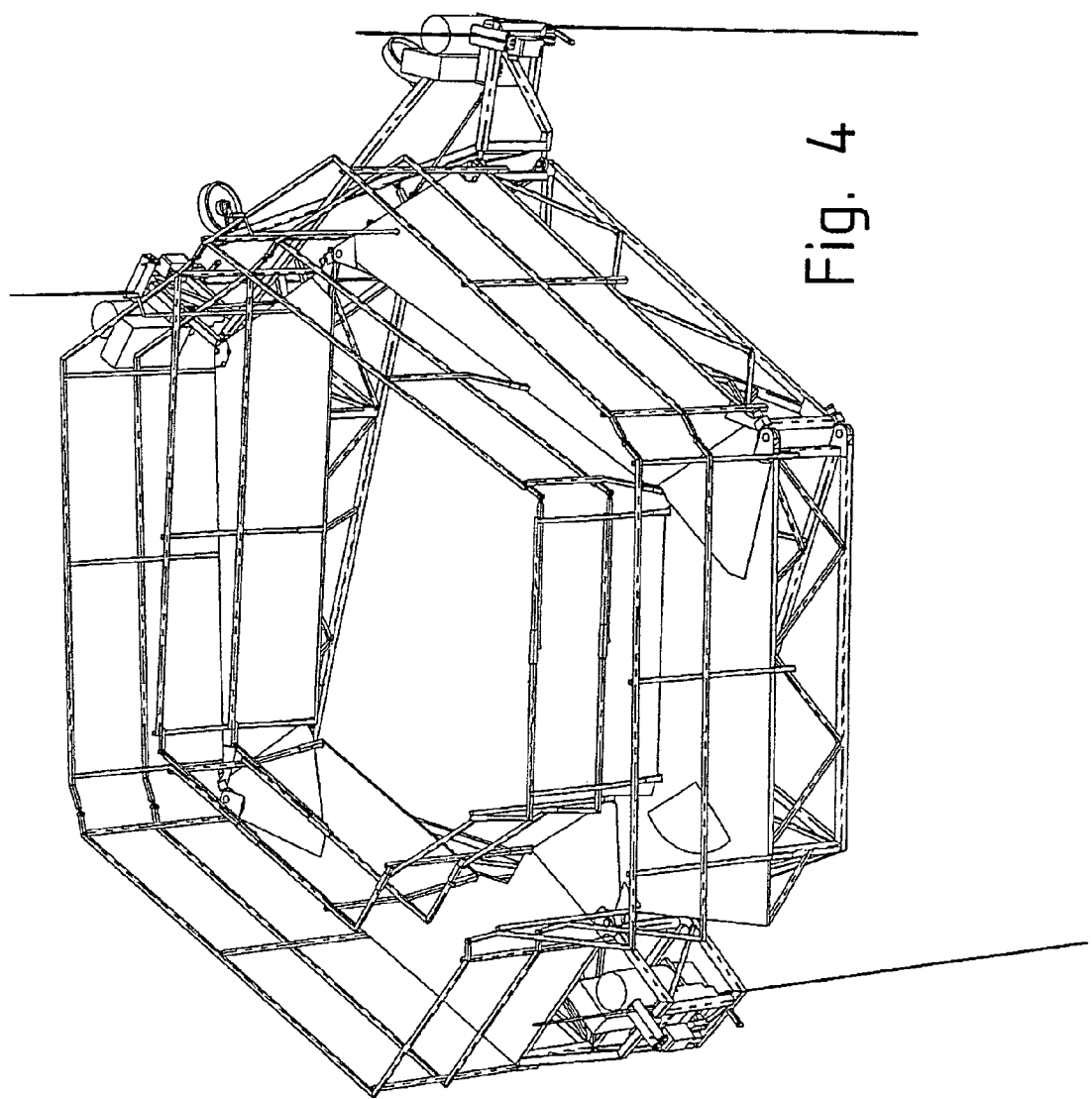
FIG. 4 the maintenance platform in FIG. 3, with sub-platforms swiveled back FIG. 5 schematic sketches for illustrating the swivelability of the maintenance platform FIG. 6 a detail of the maintenance platform in FIGS. 1-4

The significant characteristic of maintenance platform 30 is that the workspace enclosed by maintenance platform 30 can be modified by swiveling the four sub-platforms 36 relative to each other. This can be seen by comparing the two swivel positions in FIG. 3 and FIG. 4. It is possible in this way to adapt the workspace enclosed by the four sub-platforms 36 optimally to the contours of a rotor blade requiring maintenance.

Sub-platforms 36 are provided with handrails 41 to protect the maintenance personnel. The handrails are configured as pipes. Inside the outer handrails, at least, a total of two longitudinally displaceable steel cables are disposed which each extend on one side of the maintenance platform from the swivel joint near the tower via the swivel joint distant from the tower, such that they partially overlap in the area of the swivel joint distant from the tower. The respective ends of the two steel cables are fastened near a post provided for the handrails. Between the attachment points, the steel cables can be moved longitudinally inside the tubular handrails and bridge the handrails of separate platforms in the area of the three swivel joints more distant from the tower. By virtue of the fact that the steel cables can be moved longitudinally inside the handrails when the sub-platforms are swiveled relative to each other, the steel cables can compensate for changes in spacing between the single handrails (see FIG. 5).

Figure 5:
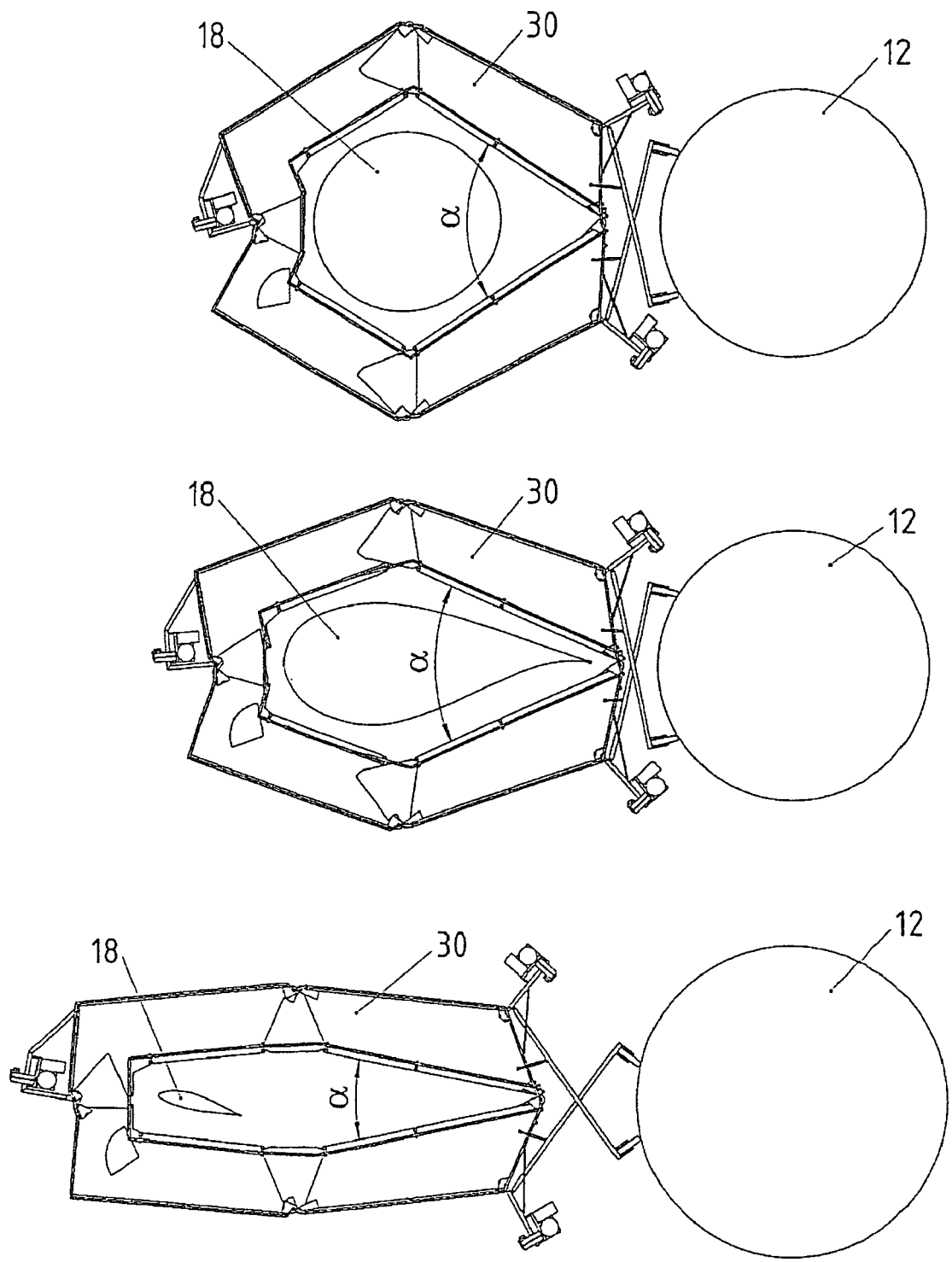

FIG. 5 shows four sections through a rotor blade 18 and tower 12 at different tower heights, with a maintenance platform 30 adapted in each case to the respective cross-sectional profile of the rotor blade. The four drawings in FIG. 5 each show the same working platform for different tower heights, or at different distances from the rotor hub. FIG. 5 indicates how the geometry of the entire maintenance platform 30 is modified by adjusting angle α.

Figure 6:
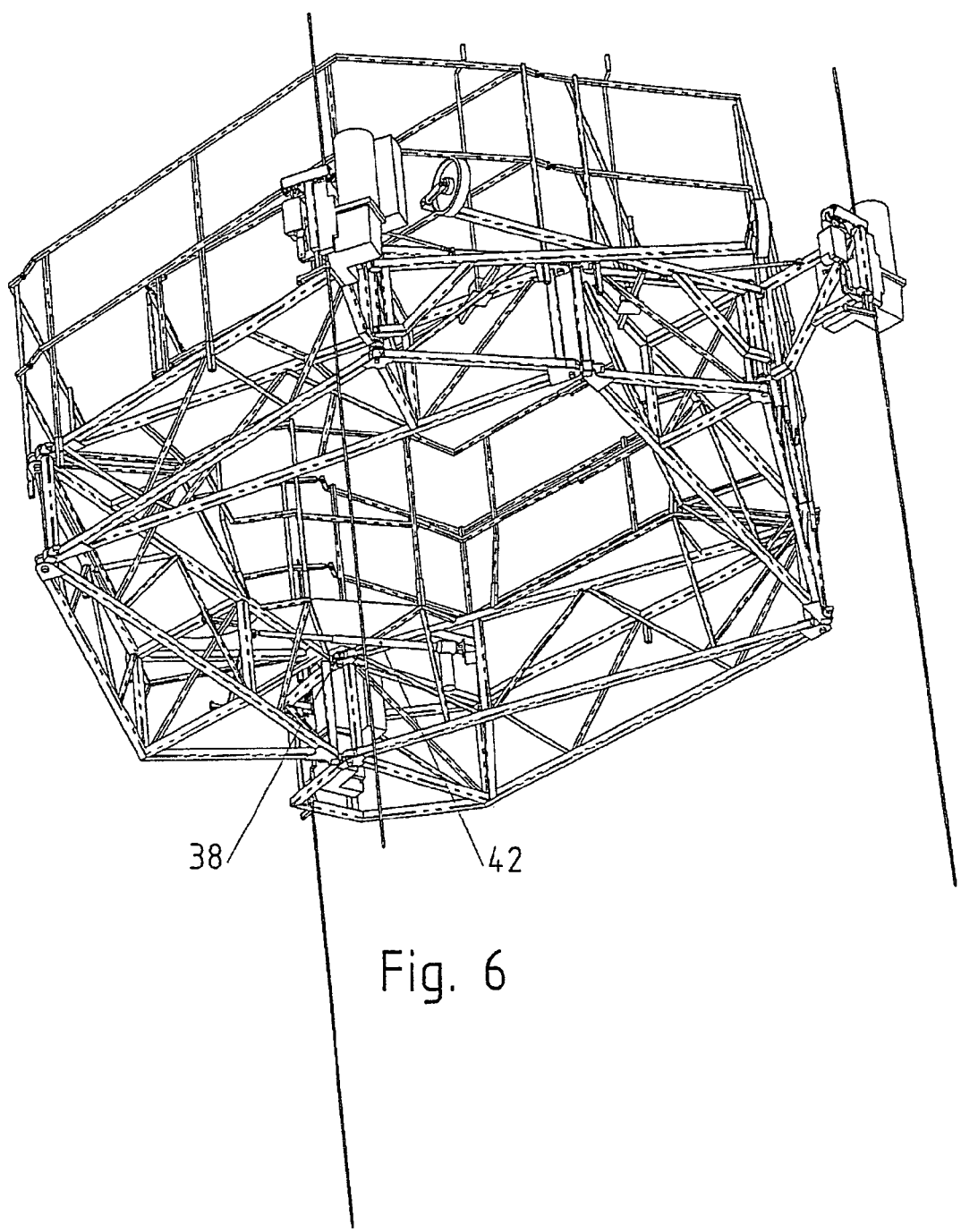

It can be seen from FIG. 6 that angle a is adjusted with the aid of a spindle drive 42 disposed in the vicinity of the swivel joint 38 shown in FIG. 6.

Figure 7:
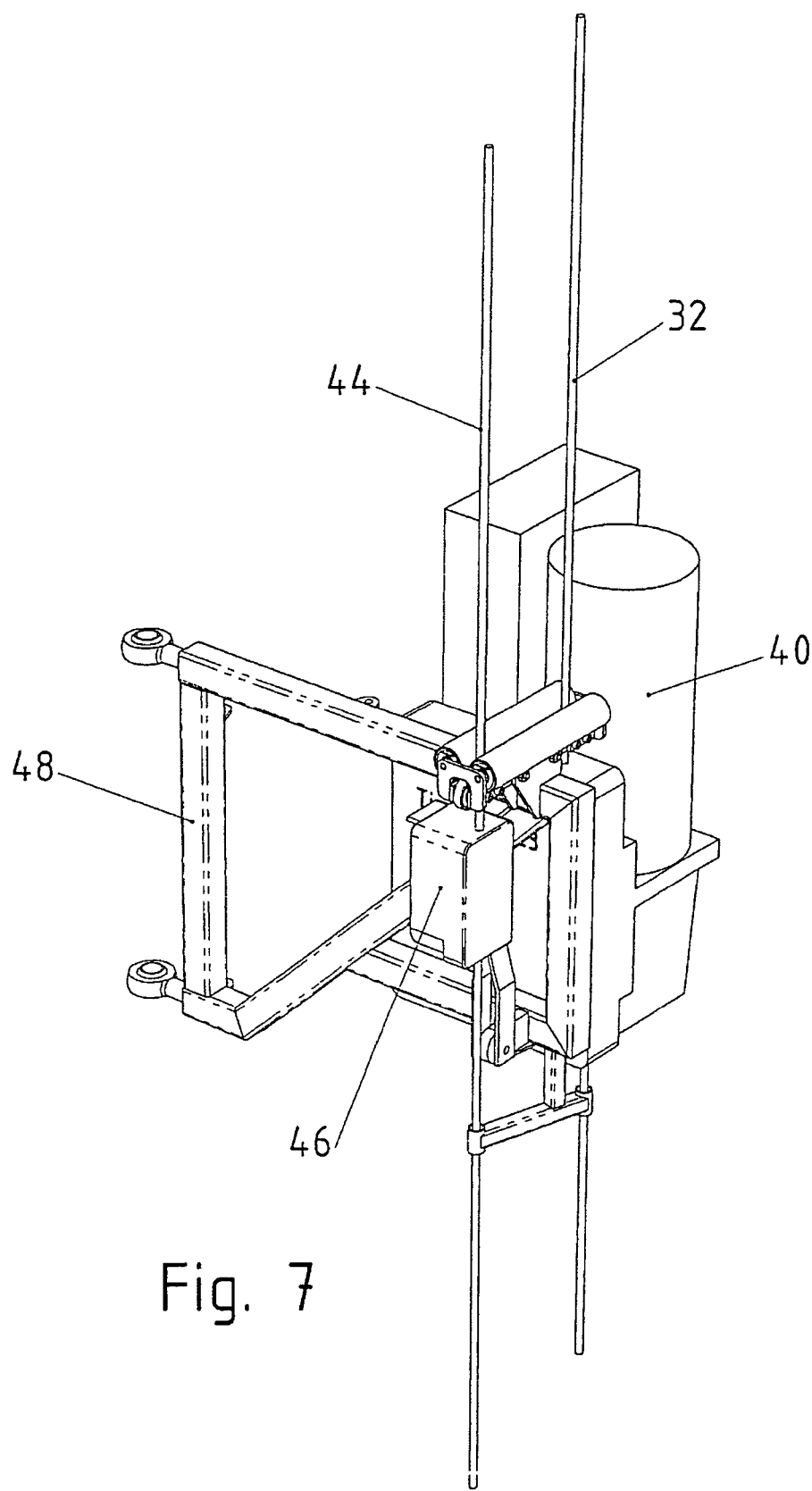
FIG. 7 a cable winch for the maintenance platform in FIGS. 1-4 and 6

FIG. 7 shows a separate view of a cable winch 40. It can be seen from the drawing that a safety cable 44 is provided in addition to support cable 32. As in an elevator, this safety cable co-operates with a block stop 46 and prevents maintenance platform 30 from falling. As can be seen from FIG. 7 as well as from FIGS. 3 and 4, the two cable winches 40 near the tower are connected to hinged outriggers 48.

Returning to FIG. 5, attention is drawn to the fact that the gap between maintenance platform 30 and the tower can be adjusted differently depending on the distance from the rotor hub or height up the tower. This is done with the aid of support wheels 50, each of which are connected via rigid outriggers 52 to one sub-platforms 36 of maintenance platform 30 (see FIGS. 3 and 4). Disposing support wheels 50 on rigid outriggers 52 in the manner shown in FIGS. 3 and 4 results in an appropriate gap also ensuing between maintenance platform 30 and tower 12 when angle α is adjusted. The geometry of rigid outrigger 52 is selected accordingly.

Figure 8:
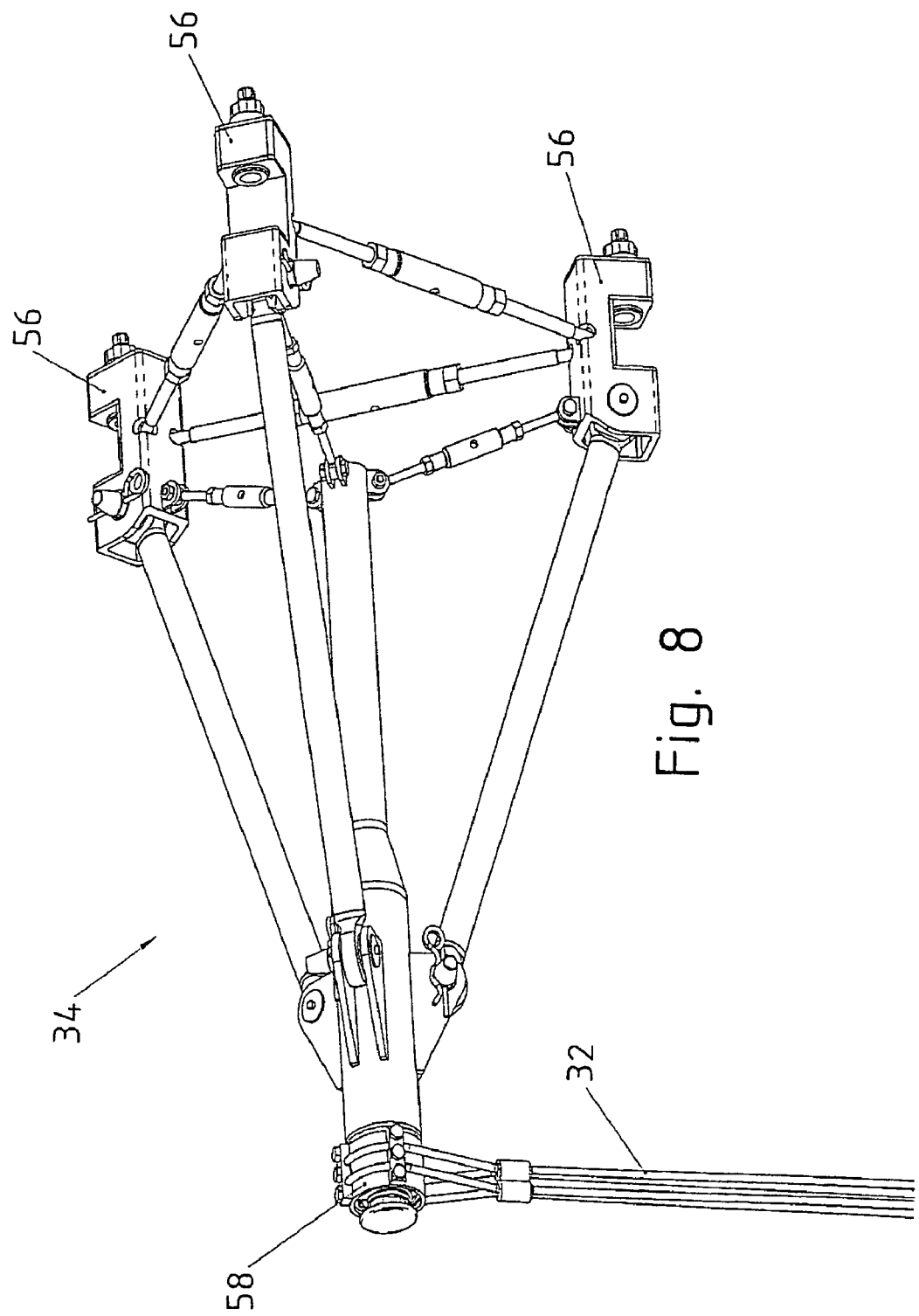
FIG. 8 a cable suspension member for a maintenance system which includes a maintenance platform pursuant to FIGS. 1-4 and 6

As can already be seen from FIG. 1, maintenance platform 30 is suspended by at least three support cables 32 from nacelle 14 and hub 12 of wind turbine 10. The two support cables 32 near the tower are attached to the nacelle 14. The support cable facing away from the tower extends on the side of the rotor place facing away from the tower, and is attached to cable suspension member 34. Cable suspension member 34 is shown in detail in FIG. 8, which shows that the cable suspension member has three anchoring clamps 56 disposed in a circle of adjustable diameter. Attached to the three anchoring clamps 56 there is a cable mount 58 to which the support cable 32 facing away from the tower and the corresponding safety cable are both attached. The cable mount 58 can be swiveled about a rotational axis running through the center of the triangle defined by the three anchoring clamps 56 and extending perpendicular to a plane defined by the three anchoring clamps 56.

Figure 9:
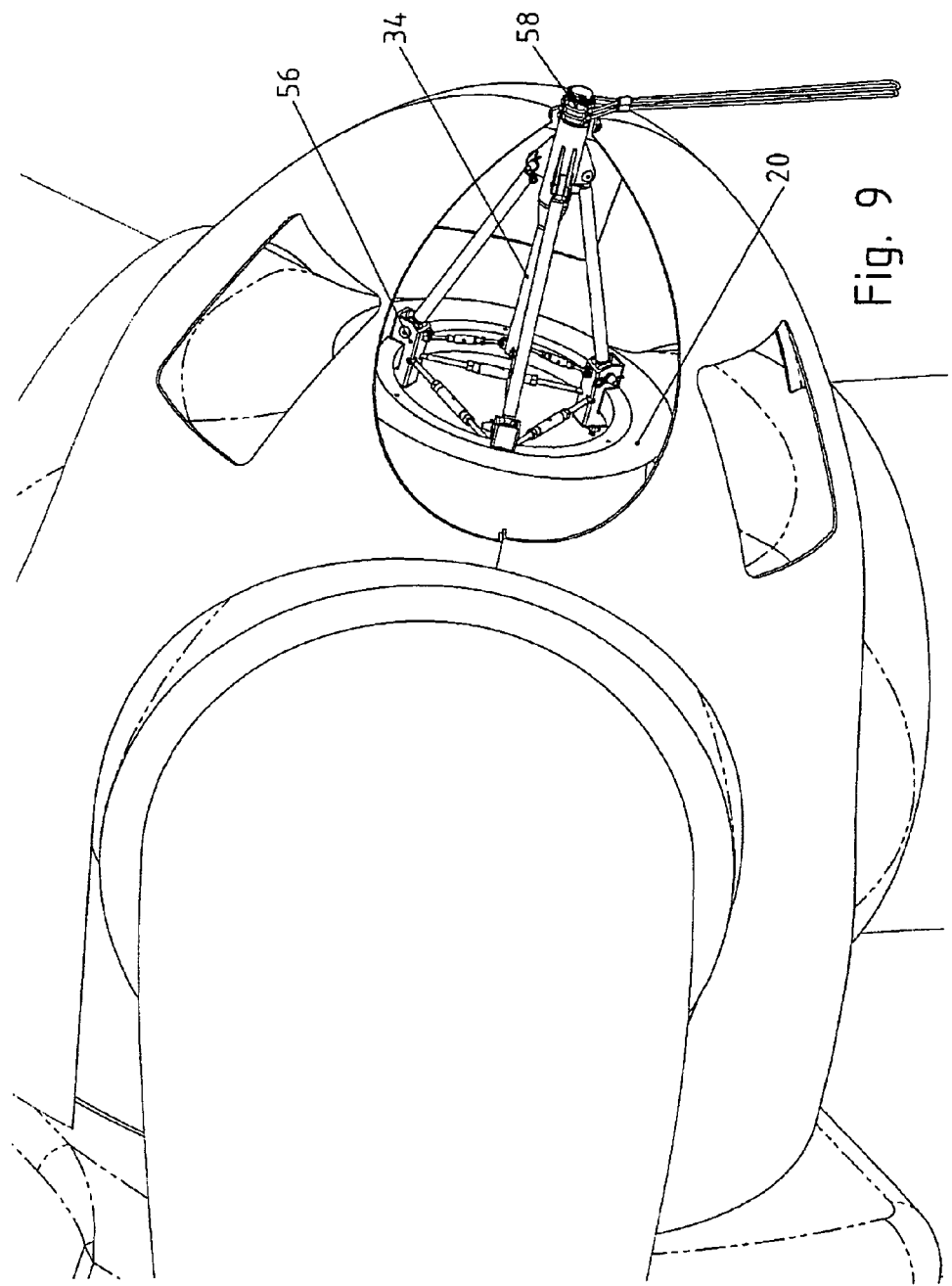
FIG. 9 a detail from FIG. 2, showing attachment of the cable suspension member in FIG. 8 to the hub of the wind turbine in FIG. 1

FIG. 9 shows the cable support member 34 mounted to the hub 20 of the wind turbine. It can be seen, in particular, that the rotational axis of cable mount 58 is identical to the rotational axis of the rotor. It can also be seen that anchoring clamps 56 are configured in such a way that cable suspension member 34 is attached interlockingly to hub 20 and is therefore secure regardless of the clamping force of anchoring clamps 56.

The invention claimed is:

1. A maintenance system in combination with a wind turbine attached to a tower, the wind turbine comprising at least two rotor blades attached to a rotor hub and forming a rotor plane extending infinitely outwardly in a direction essentially perpendicular to a rotational axis of the rotor hub, the maintenance system comprising:

a maintenance platform comprising:
at least two sub-platforms defining a working plane, wherein said sub-platforms are swivably connected to each other by a swivel joint having a swivel axis substantially perpendicular to the working plane,
first, second and third support cables, wherein the first, second and third support cables are each attached to one of the at least two sub-platforms and none of the support cables intersect the rotor plane, and
wherein the first support cable is suspended from a cable suspension member which is attached to the rotor hub, wherein said cable suspension member bears the first support cable on an opposite side of the rotor plane from the tower and at least one of the second and third support cables is directly attached to a nacelle of the wind turbine.

2. The maintenance system of claim 1, wherein the cable suspension member comprises an adjustable-diameter, three-point mounting for securely mounting the cable suspension member to the rotor hub.

3. The maintenance system of claim 2, additionally comprising a cable mount configured to be freely rotatable about the rotational axis.

4. The maintenance system of claim 1, wherein the at least two sub-platforms of the maintenance platform comprise comprises four sub-platforms joined together by four swivel joints to form a closed chain enclosing a workspace, in which each sub-platform is connected to two swivel joints.

5. The maintenance system of claim 1, further comprising a spindle drive adjustably connecting two of the at least two sub-platforms, said spindle drive being disposed relative to the swivel joint so as to aid a pivoting of the sub-platforms connected by the spindle drive relative to each other in the working plane at the swivel joint.

* * * * *